W. B. MALLORY.
SPRING WHEEL TIRE.
APPLICATION FILED MAY 12, 1910.

1,041,829.

Patented Oct. 22, 1912.
2 SHEETS—SHEET 1.

Inventor
William B. Mallory

Witnesses

By 
Attorneys

W. B. MALLORY.
SPRING WHEEL TIRE.
APPLICATION FILED MAY 12, 1910.
1,041,829.
Patented Oct. 22, 1912.
2 SHEETS—SHEET 2.
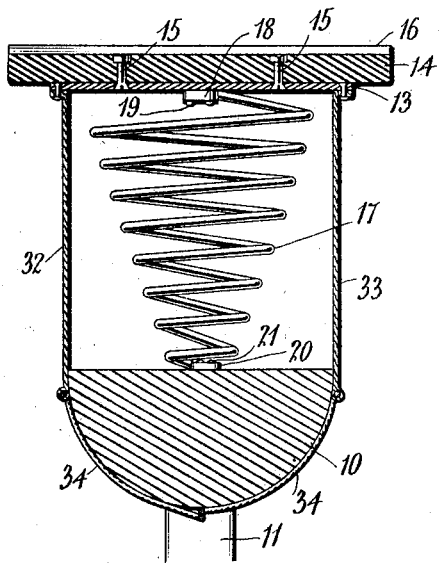
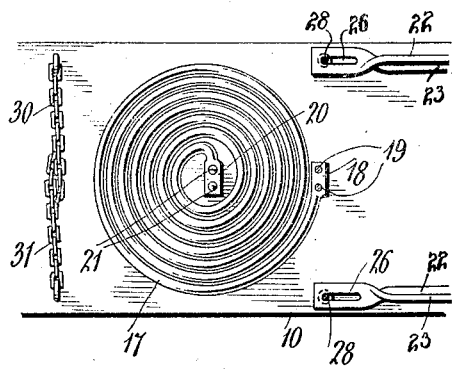
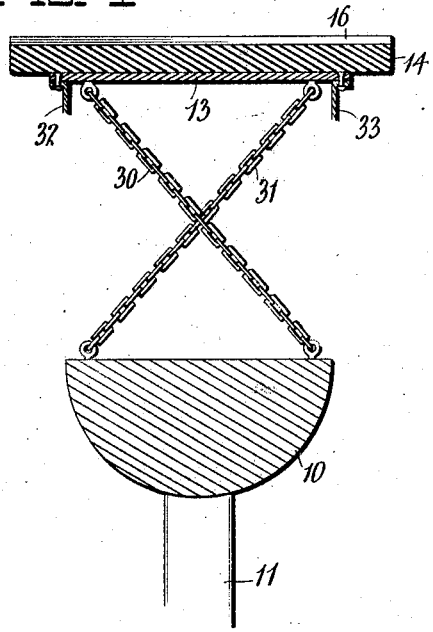
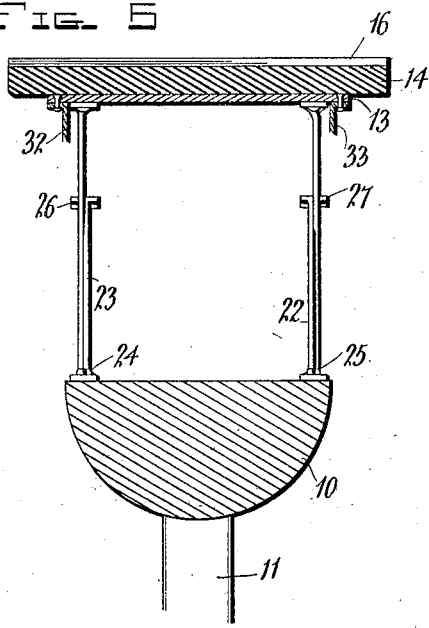
Witnesses
Inventor
William B. Mallory
By
Attorneys

UNITED STATES PATENT OFFICE.

WILLIAM B. MALLORY, OF HERMOSA, SOUTH DAKOTA.

SPRING WHEEL-TIRE.

1,041,829.  Specification of Letters Patent.  Patented Oct. 22, 1912.

Application filed May 12, 1910. Serial No. 560,932.

*To all whom it may concern:*

Be it known that I, WILLIAM B. MALLORY, a citizen of the United States, residing at Hermosa, in the county of Custer, State of South Dakota, have invented certain new and useful Improvements in Spring Wheel-Tires; and I do hereby declare the following to be a full, clear, and exact description of the invention, such as will enable others skilled in the art to which it appertains to make and use the same.

This invention relates to improvements in spring wheel tires, more particularly to the wheels of automobiles and like vehicles, and has for one of its objects to provide a simply constructed device wherein the tire is rigidly supported from lateral movement while free to yield toward the hub under the pressure incident to its use.

Another object of the invention is to provide a wheel of this character wherein the outer rim is reinforced and supported, and prevented from lateral movement, and the supporting elements guarded and protected from dust and like matter.

Figure 1:
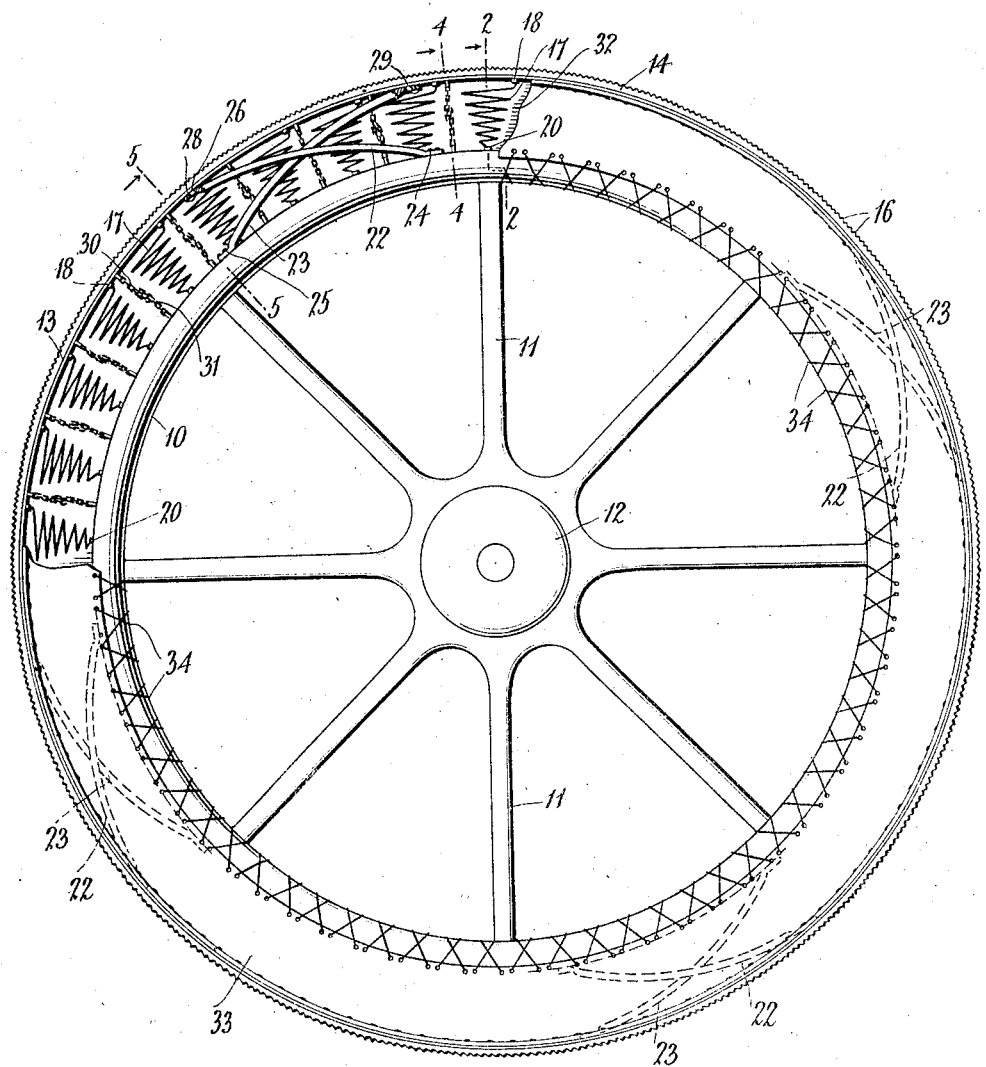
Figure 1:

With these and other objects in view, the invention consists in certain novel features of construction as hereinafter shown and described and then specifically pointed out in the claims; and, in the drawings illustrative of the preferred embodiment of the invention, Figure 1 is a side elevation of a wheel having the improved device attached thereto and partly in section, Fig. 2 is a transverse section, enlarged, on the line 2—2 of Fig. 1, Fig. 3 is a plan view of a portion of the felly portion of a wheel with one of the coiled springs attached thereto, illustrating its construction, Fig. 4 is a transverse section, enlarged, on the line 4—4 of Fig. 1, Fig. 5 is a transverse section, enlarged, on the line 5—5 of Fig. 1, looking in the direction of the arrow.

The rim of the wheel to which the improved device is adapted to be attached is formed with an outer flat surface and is represented conventionally at 10 and connected by the spokes 11 to the hub 12. Surrounding the rim 10 and spaced therefrom is an outer rim 13, preferably formed from a continuous steel band equal in width to the rim. Bearing upon the outer surface of the rim 13 is a supplemental tire 14 of yieldable material, such as rubber, leather, or the like, and is secured by rivets or other suitable fastening means 15 to the rim, and is preferably wider than the rim so that it overhangs the latter at its edges, as shown. The outer face of the member 14 is preferably ribbed or corrugated, as represented at 16, to increase its tractive force, and prevent slipping and "sluing." Located between the inner rim 10 and the outer rim 13 at suitable intervals are coiled springs 17, the springs being preferably in conical shape so that when compressed the convolutions will fold one within the other. The outer convolution of each spring is flattened as shown at 18 and bears against the inner face of the rim 13 transversely thereof and riveted or otherwise secured thereto as shown at 19. The inner terminal convolution of each spring is likewise flattened as shown at 20 and extends transversely of the rim 10 and is secured thereto by screws or other suitable fastening means 21. The flattened portions 18—20 are so arranged that when the springs are compressed the flattened portions will lie alongside of each other, and not bear one upon the other, so that the springs may be compressed to their fullest extent without interfering with the flattened portions. By this arrangement if the pressure is sufficient the outer rim will be spaced from the inner rim by a distance equal to the thickness of the wire which composes the springs, as will be obvious. Any required number of the springs 17 may be employed.

Connected between the inner rim 10 and the outer rim 13 at suitable intervals are a plurality of resilient brace members 22—23 arranged in sets of four, one pair adjacent each side of the tire with the braces of each pair extending outwardly from the inner rim in opposite directions, crossing each other intermediate their length. One end of each of the braces 22 is firmly secured by screws or other fastening devices 24 to the rim of the wheel, while one end of each of the braces 23 is secured in like manner at 25 to the inner rim. The braces are thus arranged in reversed relations and bear at their outer ends against the inner face of the tire 13. The free ends of the braces are slotted longitudinally as represented at 26, and are movably connected to the rim by clamp bolts 28—29.

By so securing the resilient brace members any strain exerted upon the tire to compress the same is taken up by the springs 17, said springs being but slightly reinforced by the braces because of the sliding of the slotted ends of the latter. If however the compression becomes excessive these resilient braces after having moved as far as possible act as reinforcing springs for the springs 17 to assist them in stiffening the tire and also to prevent any creeping movement thereof.

Connected between the rim 10 and the outer rim 13 at suitable intervals are other diagonal supporting members, preferably formed of sections of chains 30—31, and connected at their ends with the inner rim and outer rim at opposite sides and crossing each other centrally thereof, as shown in Fig. 4. By this means the outer rim 13 is firmly supported from lateral movement. The spring 17, the longitudinal braces 22—23 and the transverse braces 30—31 thus co-act to rigidly support the outer rim against lateral and longitudinal movement thereof, while at the same time permitting the necessary yieldable movement toward and away from the inner rim.

Connected to the outer rim 13 at its opposite edges are "skirt" or cover members 32—33, of rubber, leather, canvas, or the like, and extend at their inner edges over the sides of the rim 10 and are secured together around the rim 10 by suitable lacings 34. The skirt members thus serve effectually to protect the various springs and braces from injury, while at the same time excluding dust, dirt, rain, snow and the like. In event of the breakage or impairment of any of the springs or the braces one or both of the skirt members may be released to enable the broken or impaired part to be replaced.

The improved device is simple in construction, can be inexpensively manufactured and applied, is strong and durable, and produces the requisite cushioning effect without danger of being punctured or otherwise injured when traveling over rough roads.

What is claimed is:—

The combination with a wheel including an inner rim, an endless resilient outer rim spaced from the inner rim, a plurality of coiled springs connected at their ends respectively to the inner rim and the outer rim, a plurality of brace chains connecting said inner rim and outer rim, a plurality of resilient braces arranged in oppositely disposed pairs, one end of each of said braces being rigidly secured to the inner rim while its opposite end is slidably secured to the outer rim, flexible skirt members connected to said outer rim and bearing over the side of the inner rim, and means for detachably connecting said skirt member to the inner rim.

In testimony whereof, I affix my signature, in presence of two witnesses.

WILLIAM B. MALLORY.

Witnesses:
 WILLIAM E. FOUKEN,
 GEORGE STRONG.